No. 721,740. PATENTED MAR. 3, 1903.
J. H. RAINS.
BAND CUTTER AND SELF FEEDER.
APPLICATION FILED AUG. 1, 1902.
NO MODEL. 4 SHEETS—SHEET 1.
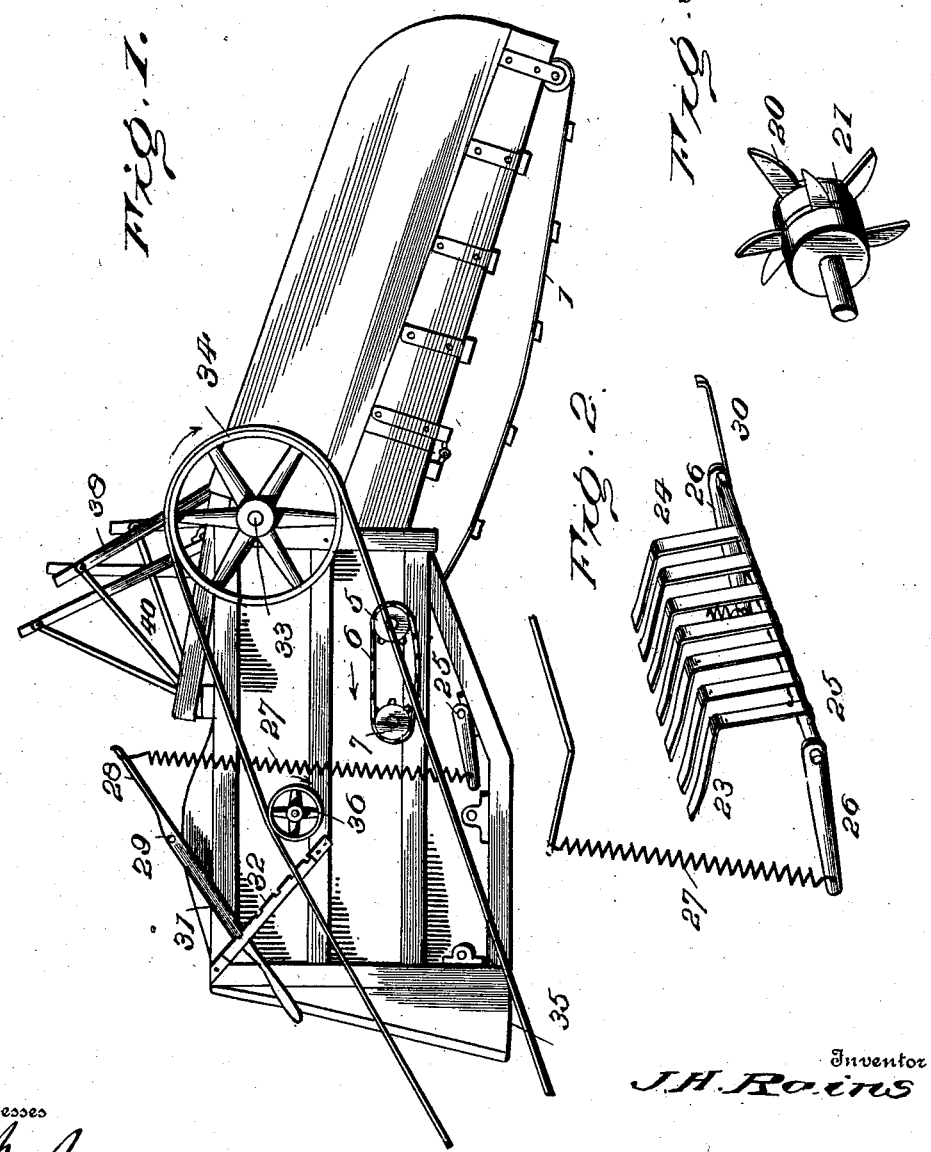
Witnesses
Inventor
J. H. Rains
Attorneys

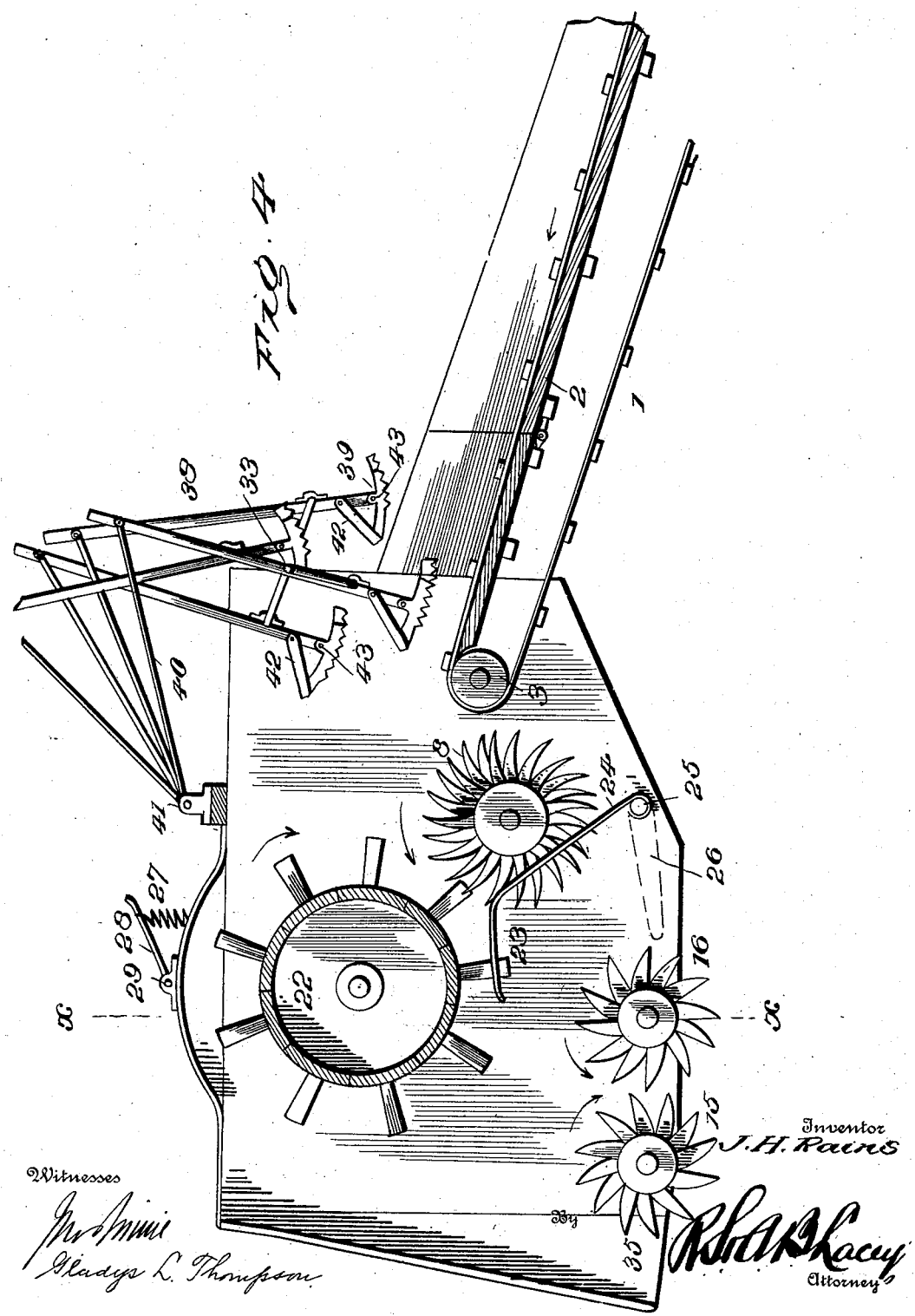

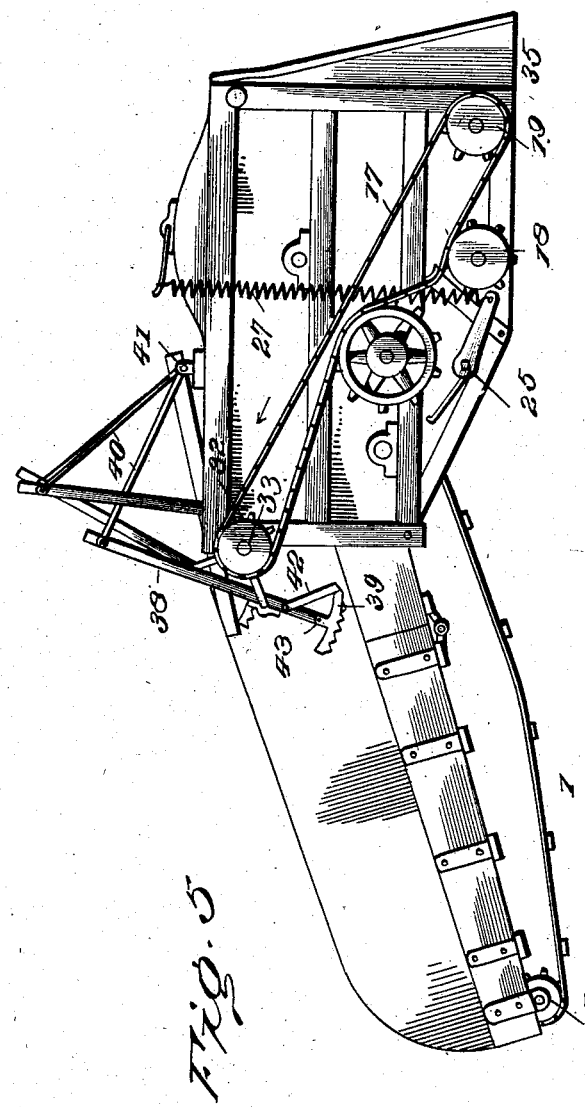

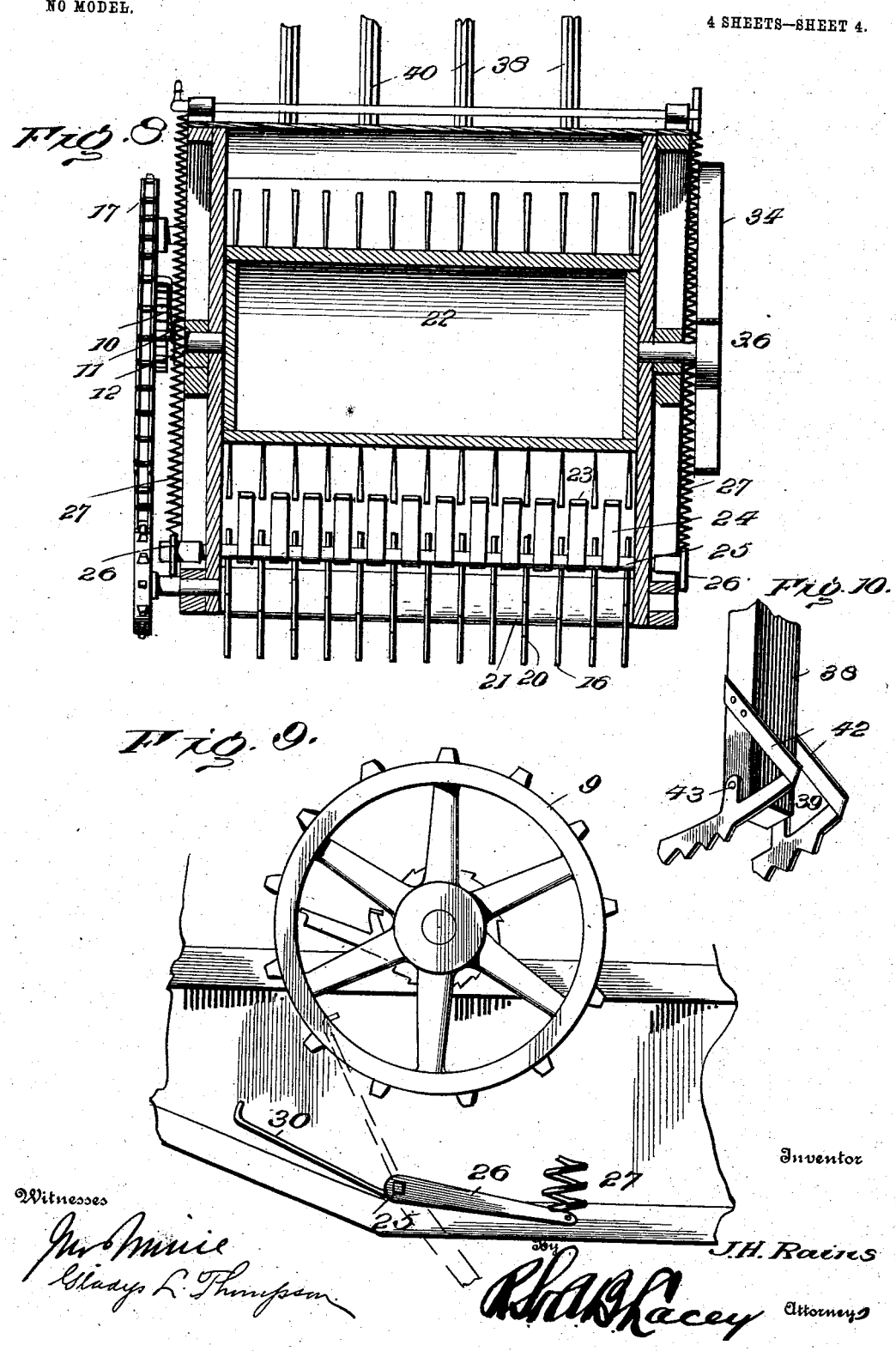

UNITED STATES PATENT OFFICE.

JESSE H. RAINS, OF McPHERSON, KANSAS.

BAND-CUTTER AND SELF-FEEDER.

SPECIFICATION forming part of Letters Patent No. 721,740, dated March 3, 1903.

Application filed August 1, 1902. Serial No. 118,013. (No model.)

*To all whom it may concern:*

Be it known that I, JESSE H. RAINS, a citizen of the United States, residing at McPherson, in the county of McPherson and State of Kansas, have invented certain new and useful Improvements in Band-Cutters and Self-Feeders, of which the following is a specification.

This invention appertains to mechanical appliances for severing the bands or binders of bunches or gavels of grain and automatically feeding the same to the cylinder of threshing-machines, the purpose being to automatically regulate the feed of the grain to the thresher, to prevent choking of the latter, and to insure a thorough separation of the grain from the straw.

The primary purpose of the invention is to combine with a band-cutter and feeding mechanism for threshing machinery a governor of novel formation which will be certain and positive in operation for effectively controlling the feed of the grain, so as to prevent choking and stoppage of the thresher, said governor being automatically controlled by the bulk of grain passing to the thresher, so as to retard the advance of the grain when feeding too rapidly, and again automatically throwing the feeding mechanism into gear when the supply of grain falls below the predetermined amount for which the feeding mechanism is set.

A further purpose of the invention is to improve the general structure of the mechanism and to arrange the parts whereby the best possible results are attained with a minimum expense of maintenance and cost of operation.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a band-cutter and self-feeder embodying the invention. Fig. 2 is a detail view in perspective of the trip mechanism for automatically retarding the feed of the grain. Fig. 3 is a perspective view of a portion of a retarder. Fig. 4 is a side view of the band-cutter and self-feeder, on a larger scale, the wall of the inner side being omitted. Fig. 5 is a view of the reverse side of the band-cutter and self-feeder. Fig. 6 is a detail view of the dog and support therefor for coöperation with the ratchet-teeth of the driver, whereby the feed of the grain is retarded. Fig. 7 is a perspective view of the parts shown in Fig. 6 and the ratchet portion of the driver with which the dog coöperates. Fig. 8 is a transverse section about on the line X X of Fig. 4. Fig. 9 is a detail view in elevation of the parts constituting the governor mechanism. Fig. 10 is a perspective view of the band-cutter.

Corresponding and like parts are referred to in the following description and indicated in all the views of the drawings by the same reference characters.

The mechanism comprises an endless carrier 1, having its upper portion supported by a table or frame 2 and its end portions passed around rollers 3 and 4, a journal of the roller 3 being extended and provided with a sprocket-wheel 5, from which motion is transmitted by a sprocket-chain 6 to a corresponding sprocket-wheel 7, secured to the proximal journal of the retarder 8, by means of which the feed of the grain to the thresher is regulated. The opposite journal of the retarder 8 is provided with the driver 9, which is a sprocket-wheel, and provided with ratchet-teeth 10 for coöperation with a dog 11 to cause the driver 9 and retarder 8 to rotate under normal conditions. The driver 9 is loosely mounted upon the journal of the retarder 8, and the support 12 for the dog 11 is secured to said journal for rotation therewith. A spring 13 holds the dog 11 in engagement with the ratchet-teeth 10 under normal conditions, whereby the driver 9 and retarder 8 rotate together. An arm 14 projects from the dog 11 and is adapted to be tripped automatically when the bulk of grain being fed to the thresher exceeds the predetermined amount, so as to throw the retarder out of action, and thereby retard the feed and diminish the supply of grain to the thresher. The retarder 8 is located at the delivery end of the carrier 1 and receives the grain therefrom. It will thus be understood that when the retarder 8 is at rest the feed or supply of grain to the thresher is diminished, and when the bulk of grain being fed is diminished the retarder 8 is automatically thrown into action and advances the grain to the mechanism coöperating therewith.

Other retarders 15 and 16 are arranged in the rear of and in a lower plane than the retarder 8 and receive the grain between them and positively advance the same to the threshing mechanism. (Not shown.) The retarders 15 and 16 are rotated in reverse directions, whereby their opposing or proximal portions travel in the same direction, as indicated by arrows in Fig. 4, so as to carry the grain forward in a positive manner to the threshing mechanism. The retarders are actuated by means of a sprocket-chain 17, which passes over a sprocket-wheel 18, attached to a journal of the retarder 16, and around a sprocket-wheel 19, applied to a journal of the retarder 15, this being shown most clearly in Fig. 5. The retarders 8, 15, and 16 are similarly constructed, each comprising a shaft upon which star-wheels 20 and spacing disks or washers 21 are alternately strung, as shown most clearly in Fig. 3, the parts being connected for simultaneous rotation. The retarder 8 is larger in diameter than the retarders 15 and 16, because of the work to be performed thereby.

A cylinder 22 is located in the rear and in a higher plane than the retarder 8 and is adapted to loosen and lighten the grain preliminary to supplying the same to the retarders 15 and 16. The passage between the retarder 8 and cylinder 22 is comparatively narrow, and the grain is compelled to travel therethrough in its advance to the threshing mechanism. A portion of this passage is yieldable and is adapted to give under an excessive pressure, such as occasioned by a too-rapid advance of the grain or an accumulation of damp grain, tending to choke the mechanism, so as to throw the retarder 8 out of action and retard the feed of the grain, thereby providing a relief for the excess of grain, whereby the congested condition is cleared. The yieldable portion of the grain-passage is formed by the bent ends 23 of a series of fingers 24, attached to a shaft 25 and spaced apart so as to admit of the points of the star-wheels of the retarder 8 and the teeth of the cylinder 22 operating in the spaces formed therebetween. The shaft 25 extends transversely of the machine, and its terminal portions are provided with arms 26, connected at their free ends by springs 27 with corresponding arms 28, projected from a transverse shaft 29. The springs 27 serve to hold the bent ends of the fingers 24 in the path of the grain passing through the passage formed between the cylinder 22 and said bent ends, and in the event of the pressure of the grain exceeding the tension of the springs 27 the fingers 24 yield and rock the shaft 25 in its bearings and throw the governor mechanism into action, so as to retard the advance of the grain to the thresher. A trip 30 projects from an end of the shaft 25 into the path of the arm 14, and coming in contact therewith throws the dog 11 out of engagement with the ratchet-teeth 10, thereby permitting the driver 9 to rotate without imparting any motion to the retarder 8. Under normal conditions the part 30 stands clear of the part 14, and the dog 11 is in contact with one of the teeth 10, thereby connecting the driver 9 with the retarder and permitting the latter to rotate when the mechanism is in operation. By having the tension of the springs 27 adjustable the sensitiveness of the governor mechanism may be varied, thereby providing for retarding the feed of the grain at any predetermined pressure upon the parts 24, as will be readily comprehended. The shaft 29 parallels the shaft 25 and is adapted to be turned so as to increase or diminish the tension of the springs 27. The shaft 29 is adapted to be turned by means of a lever 31, applied thereto, and coöperates with a notched bar 32 for holding the shaft 29 in the required adjusted position.

A compound crank-shaft 33 is located above the delivery portion of the conveyer 1, and its crank portions are set quartering, so as to successively bring the band-cutters into position for active operation. A band-pulley 34 is applied to an end portion of the shaft 33, and motion is imparted thereto from a suitable source of power by means of the drive-belt 35. A portion of this drive-belt passes over a pulley 36, applied to a journal of the cylinder 22, so as to impart motion thereto. The opposite end of the shaft 33 is provided with a sprocket-wheel 37, around which the sprocket-chain 17 passes and which serves to transmit motion to the driver 9 and sprocket-wheels 18 and 19 of the retarders 16 and 15. The band-cutters are mounted upon the crank portions of the shaft 33 and comprise arms 38 and blades 39. Links 40 are pivotally connected to the upper ends of the arms 38 at one end and are pivotally mounted at the opposite end upon a rod 41, extending transversely of the machine. The arms 38 receive an oscillatory movement and a simultaneous up-and-down movement, whereby the blades are alternately carried forward, thence upward, rearward, and downward preliminary to again coming in contact with the bunch for severance of the band or tie. Each arm 38 is provided with a pair of blades 39, which are secured to opposite sides thereof by the same fastening means. The blades are toothed and curved, and each is formed with a brace 42 and a tang 43, by means of which the blades are firmly secured to the arms.

As clearly shown in Fig. 10, the pairs of blades 39 are formed from a single strip of metal, the same being bent to form the brace 42 of one blade, then twice bent to form the brace of the other blade, and finally bent to properly dispose the cutting portion of the other blade. The tangs 43 are integral extensions of the strip from which the blades are formed.

The operation of the band-cutting and feeding mechanism may be briefly stated as follows: The bunches or gavels of grain are supplied by hand or otherwise to the conveyer 2 and are carried upward and forward in succession to the cutting mechanism, which severs the bands or ties and liberates the grain, which is delivered to the retarder 8 and carried forward by it through the passage formed between it and the parts 23 and the cylinder 22, the latter loosening and lightening the grain and causing the same to be supplied to the retarders 15 and 16, by means of which it is advanced to the thresher in the manner well understood. In the event of damp grain being fed to the thresher or the bulk of grain exceeding a predetermined amount, so as to create a pressure upon the part 23 in excess of the tension of the springs 27, the governor mechanism will be thrown into action by the tripping of the part 23 or the rocking of the shaft 25, thereby throwing the retarder 8 out of action and retarding the supply or feed of the grain. When the congested condition has been relieved and the pressure upon the part 23 is diminished, the springs 27 return the shaft 25 to a normal position and throw the trip-arm 30 out of the path of the part 14, and the spring 13 being relieved throws the dog 11 into engagement with a ratchet-tooth 10, thereby locking the driver to the shaft of the retarder 8, which is again thrown into action for supplying and advancing the grain in the manner stated.

Having thus described the invention, what is claimed as new is—

1. A band-cutter and self-feeder comprising a carrier, cutting mechanism arranged at the delivery end of the carrier and above the same to assist the feeding operation, a rotary retarder adjacent to the rear end of said carrier and below the plane of the delivery end thereof, a rotary cylinder in the rear and in a higher plane than the first-mentioned retarder, and a pair of rotary retarders arranged to receive the grain from the aforesaid retarders for positively feeding the same to the thresher, substantially as set forth.

2. In a band-cutter and feeder, the combination with feeding mechanism, comprising a carrier and cutting mechanism located above the delivery end thereof, a rotary retarder disposed in rear of the said delivery end and adapted for coöperation with a cylinder adjacent thereto, a series of fingers extended into the path of the grain and disposed in their normal position so as to remain about intermediate the aforesaid retarder and cylinder and sustaining the weight of the grain passing therebetween, and a pair of secondary rotary retarders arranged in rear of the first-mentioned retarder and the cylinder and adapted for positively feeding the grain to the thresher and by their continuous rotation to coöperate with the actuating fingers to cause the quantity of grain being fed to the thresher to be maintained in accordance with the normal capacity thereof, substantially as described.

3. In a band-cutter and feeder, and in combination with the feeding mechanism including a rotary retarder, clutch mechanism, a cylinder in rear of and a rock-shaft below said retarder, fingers extended from the rock-shaft so as to normally lie in the path of the grain and about intermediate the cylinder and the retarder to receive the weight of the grain after same has passed therebetween, said fingers being adapted when depressed to actuate a trip upon the rock-shaft, thereby throwing the clutch mechanism out of action, whereby the whole initial feeding mechanism consisting of the carrier and the aforesaid retarder is stopped, and secondary retarders located in rear of the actuator-fingers and adapted to continuously deliver the grain therefrom to the thresher and whereby the said fingers are relieved of excess of pressure caused by abnormal feeding or clogging and allowed to resume their normal position throwing the clutch back into action and again starting the initial feed mechanism, substantially as described.

4. In a band-cutter and feeder, and in combination with the feeding mechanism including a rotary retarder, a cylinder, a rock-shaft having fingers extending therefrom into the path of the grain at a point intermediate the retarder and cylinder receiving the weight of the grain and adapted to be actuated by excessive feed thereof, a clutch mechanism for simultaneously throwing the initial feeding mechanism comprising the retarder and carrier into and out of action, said clutch consisting of a sprocket-wheel driver provided with ratchet-teeth upon the hub portion thereof and loosely mounted upon a journal of the retarder, a disk mounted for rotation with the retarder-journal, a dog pivoted to said disk and normally held in engagement with the teeth of the driver to rotate the retarder and actuate the carrier, an arm projected from the dog integral therewith, a trip projected from the rock-shaft aforesaid and adapted to engage the arm of the dog and throw the clutch out of action upon actuation of the rock-shaft caused by clogging of the grain in the space between the cylinder and retarder, a pair of secondary rotary retarders being located in the rear of the fingers to receive the grain therefrom and positively convey same to the thresher, also relieving excessive strain upon said fingers.

5. In a band-cutter and feeder, and in combination with the feeding mechanism comprising a carrier and a rotary retarder adjacent the delivery end thereof, a cylinder, clutch mechanism for throwing the initial feeding mechanism, aforesaid, into and out of action, a rock-shaft below the retarder and having fingers extended therefrom into the path of the grain to be actuated by excessive feed thereof, said fingers normally maintaining a position intermediate the cylinder and retarder, a trip extended from the rock-shaft for throwing the clutch out of action, arms extending from the said rock-shaft, a shaft paralleling the same and having arms corresponding to those upon the said shaft extended therefrom, springs between the corresponding arms of each of the shafts and a lever connected to the upper shaft and adapted to be adjusted in its position to cause a retarding of the feed at any predetermined pressure upon the fingers of the rock-shaft, a compound crank-shaft located above the delivery portion of the carrier and cutters comprising arms and pairs of blades mounted upon crank portions of the shaft, a metallic strip being sharpened at one end to form one cutting-blade and bent to form a brace for such blade, then twice bent at right angles to form the securing portion of the pairs of blades and finally bent to properly dispose the second cutting-blade of each pair, substantially as described.

In testimony whereof I affix my signature in presence of two witnesses.

JESSE H. RAINS. [L. S.]

Witnesses:
CARL P. MILLER,
S. M. MILLER.